United States Patent Office 3,174,345
Patented Mar. 23, 1965

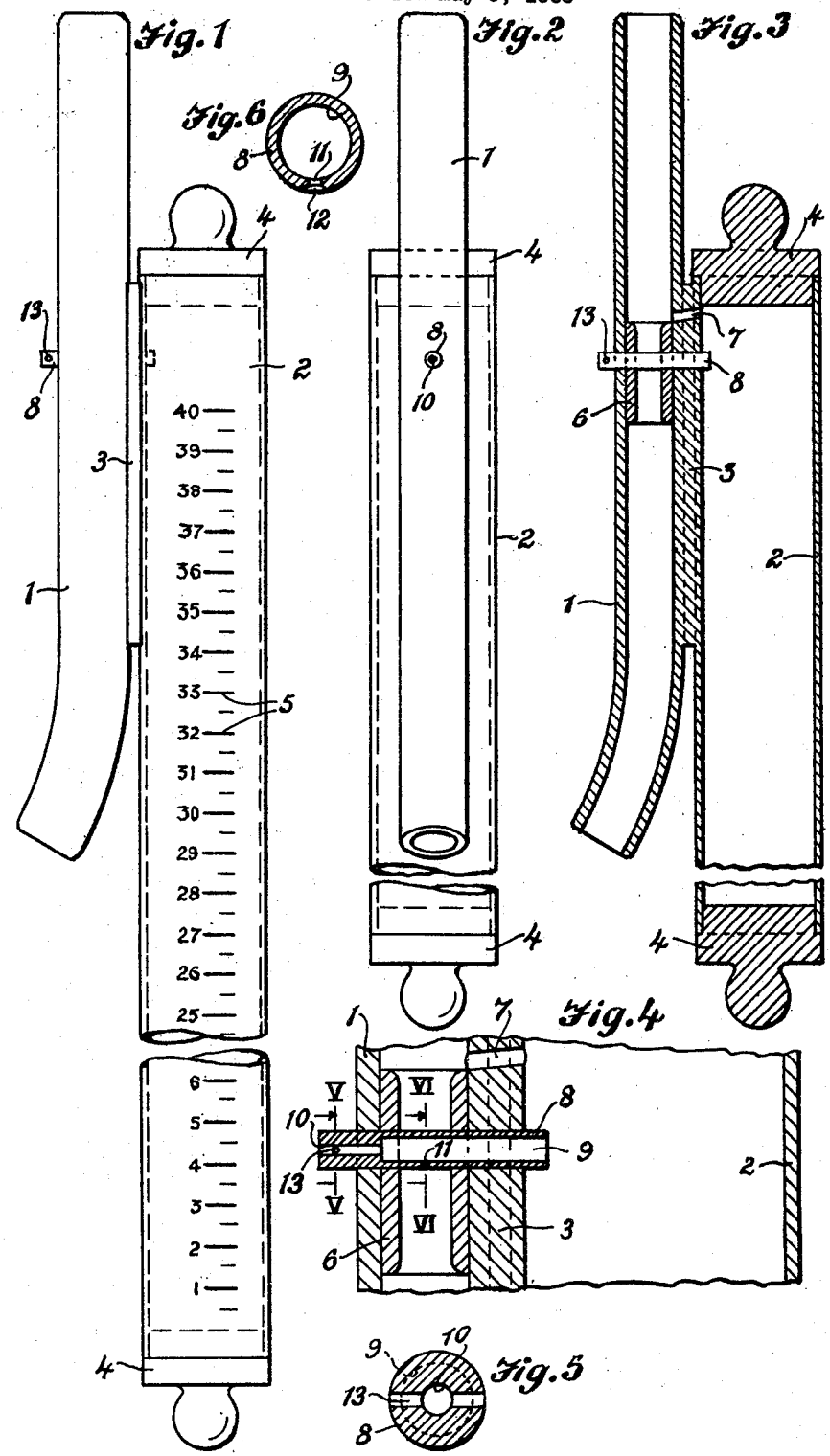

3,174,345
MILK YIELD INDICATOR AND SAMPLING DEVICE
Syd Ernest Bodmin, 317 Thames St.,
Morrinsville, New Zealand
Filed May 6, 1963, Ser. No. 278,365
Claims priority, application New Zealand, May 8, 1962,
132,023
13 Claims. (Cl. 73—422)

The invention relates to milk yield indicators and sampling devices for vacuum-operated milking machines, the invention being concerned with apparatus of the kind in which a portion of the milk delivered by a cow is diverted into a measuring vessel which provides an index to the total yield as the result of a milking operation, the diverted portion also being usable, if desired, as a sample for testing as to quality.

Previous constructions of apparatus of the kind under consideration have not been reliable in operation, their design having been such that the indicated quantity of diverted milk has not represented a truly proportional measure of the total quantity yielded. Moreover, certain prior constructions have tended to act to cause certain physical changes to take place in the constitution of the diverted portion of the milk so that when this portion is used for testing as to quality—for butterfat content for instance—the results have not been truly indicative of the quality of the milk actually given by the cow.

It is an object of the present invention to provide a milk yield indicator and sampling device which will give extremely accurate results both as to quantity and quality, these advantages being obtained without having to make the apparatus of complicated construction.

The apparatus according to the invention comprises a vertically arranged supply pipe adapted to be interposed in the milk line of the milking machine so that its upper end will be in communication with the discharge side of the line while its lower end will be in communication with the teat-cup claw, the pipe containing a tubular constrictor. A transparent and calibrated measuring chamber or flask is arranged vertically and secured to one side of the supply pipe. A duct extends between the supply pipe and the measuring chamber to thereby enable the measuring chamber to be evacuated when suction is created in the supply pipe and a jet tube is provided passing from the outside of the supply pipe, through the constrictor and into the measuring chamber. The jet tube has a first orifice of relatively large diameter opening into the measuring chamber, a second orifice of relatively small diameter communicating with the first orifice and opening to atmosphere at the outside of the supply pipe, and a third orifice extending downwardly from the first orifice and opening into the constrictor so that part of the milk passing through the supply pipe will be diverted through the third and first orifices into the measuring chamber. The sizes of the second and third orifices are so related to one another that air passing from atmosphere through the second orifice will act to control the flow of diverted milk in such manner as to ensure that the quantity of milk reaching the measuring chamber will be constantly proportional to the quantity of milk passing through the supply pipe.

Reference is now made to the accompanying drawings which illustrate apparatus constituted by a milk yield indicator and sampling device as constructed in accordance with one embodiment of the invention.

In the drawings:

FIGURE 1 is a side elevational view of the apparatus the measuring chamber being foreshortened because of space limitations;

FIGURE 2 is a front elevational view of the apparatus of FIG. 1, the measuring chamber being still further foreshortened;

FIGURE 3 is a vertical sectional view corresponding to FIGURE 2;

FIGURE 4 is a fragmentary vertical sectional view to an enlarged scale of a detail of the apparatus;

FIGURE 5 is a cross-sectional view taken on the line V—V in FIGURE 4, and

FIGURE 6 is a cross-sectional view taken on the line VI—VI in FIGURE 4.

As illustrated, the apparatus consists of a vertically disposed supply pipe 1 of stiff material, the pipe being conveniently about nine inches in length and having a half-inch diameter bore. The supply pipe 1 is adapted to be interposed in the milk line of the milking machine so that its upper end is in communication with the discharge while its lower end will be in communication with the teat-cup claw.

A vertically disposed measuring chamber 2 is bonded to one edge of the supply pipe 1 as indicated at 3 in FIGS. 1, 3 and 4. The chamber 2 is made from a length of rigid transparent tubing having a bore of constant cross-sectional size, the chamber being about eighteen inches in height and the bore being one-and-three-eighths inches in diameter. The chamber 2 is closed at its upper and lower ends by removable stoppers 4 of rubber or similar material, thus permitting the chamber to be thoroughly cleaned when necessary. The chamber is marked on the outside with numbered graduations 5 (FIGURE 1) arranged at regular intervals one above the other. The graduations serve a two-fold purpose, namely, they indicate the quantity of milk actually received by the measuring chamber, and they provide an index to the quantity of milk that has passed through the supply pipe 1. Thus the graduations may be such, for example, that each one indicates one ounce of milk received by the measuring chamber and at the same time indicates that, for that one ounce, four pounds of milk have passed through the supply pipe 1 on its way to the discharge point. Thus, supposing that at the end of a milking operation the level of milk in the measuring chamber stands at six ounces, it will be known that twenty-four pounds of milk have been delivered at the discharge point. This, plus the quantity standing in the measuring chamber, will give the total yield.

The measuring chamber 2 is so positioned with respect to the supply pipe 1 that the upper end portion of the latter projects above the measuring chamber to thereby facilitate connection of the upper end of the supply pipe to the discharge side of the milk line. As the measuring chamber 2 is longer than the supply pipe 1 and thus extends below the supply pipe, the lower end portion of the latter is curved outwardly as shown in FIGURES 1 and 3 to thereby facilitate connection of the lower end of the supply pipe to the part of the milk line extending from the teat-cup claw.

Within the supply pipe 1 there is provided a tubular constrictor 6 (FIGS. 3 and 4) which fits closely within the bore of the pipe and is bonded thereto, the constrictor being located adjacent the upper end of the measuring chamber 2. In accordance with the previous dimensions given for the other elements of the apparatus, the constrictor 6 may be about one inch in length and have a bore of five-sixteenths of an inch in diameter.

Immediately above the constrictor 6 there is provided a vacuum duct 7 (FIGURES 3 and 4) which passes through the part of the side wall of the supply pipe adjoining the bond 3, through the bond itself, and through the adjoining wall of the measuring chamber 2, the duct thus having one end opening into the supply pipe just above the constrictor 6 and the other end opening into the upper part of the measuring chamber. The duct can conveniently have a diameter of one-eighth of an inch. The duct is shown to be inclined slightly upwardly in the direction of the measuring chamber.

The apparatus includes a horizontally disposed jet tube 8 which passes, in a leak-proof manner, from the outside of the supply pipe 1, diametrically through this pipe and hence diametrically across the bore of the constrictor 6, and then into the measuring chamber 2. The jet tube 8 can conveniently be constituted of non-corrosive round metal rod of about three-sixteenths of an inch in diameter.

As shown in FIGURES 4, 5 and 6, the jet tube 8 has a first orifice 9 of relatively large diameter extending axially part-way through the length of the jet tube so that one end opens into the measuring chamber 2 while the other end stops short of the outer end of the jet, this latter end being conveniently situated in line with the edge of the bore of the supply pipe 1 that is most remote from the measuring chamber 2.

The jet tube 8 also has a second orifice 10 extending axially from the outer end of the orifice 9 to the outer end of the jet, the orifice 10 thus placing the orifice 9 in communication with the atmosphere. The orifice 10 is of relatively small diameter compared with that of the orifice 9.

The jet has a third orifice 11 of smaller diameter than the second orifice 10. The third orifice 11 is formed vertically through the lower edge portion and is so positioned that its lower end opens into the bore of the constrictor 6 while its upper end opens into the first orifice 9. The third orifice 11 is preferably so arranged that it is in line with the axis of the bore of the constrictor, and its lower end may open into a shallow cup-like depression 12 (FIGURE 6) formed in the lower edge of the jet 8.

Suitable diametrical dimensions for the three orifices are: first orifice 9—one-eighth of an inch, second orifice 10—57 S.W.G., and third orifice 11—from 72 to 73 S.W.G.

The various dimensions given in the foregoing are not critical and may be varied within limits so long as the second orifice 10 is of smaller diameter than the first orifice 9, and the third orifice 11 is of smaller diameter than the second orifice.

After the supply pipe 1 has been fitted in the milk line in the manner described and other things have been made ready for a milking operation, the indicator operates as follows:

The vacuum created in the milk line from the vacuum pump of the milking machine, and consequently in the supply pipe 1 which forms part of the line, causes the interior of the measuring chamber 2 to become evacuated via the vacuum duct 7.

As milk flows upwardly through the supply pipe 1 it will pass through the bore of the constrictor 6 which will speed up the flow thereat while the milk is passing over the portion of the jet tube 8 that bridges the bore of the constrictor.

As vacuum exists in the measuring chamber 2, this vacuum will extend into the first orifice 9 of the jet tube 8 and then into the third orifice 11. Hence, a small proportion of the milk flowing through the constrictor 6 will pass in the third orifice 11 and into the first orifice 9 from which it will be discharged into the measuring chamber 2. At the same time, flow of milk along the first orifice 9 towards the measuring chamber 2 will cause air from the atmosphere to be drawn into the second orifice 10 and thus to become mixed with the milk flowing along the first orifice. As the speed of flow of milk in the main stream increases through the constrictor 6, so will a greater quantity of milk be admitted to and flow along the first orifice 9 from the third orifice 11, thus increasing the air-induction effect. Conversely, as the speed of movement of the milk in the main stream decreases through the constrictor, a lesser quantity of milk will be admitted to and flow along the first orifice 9 from the third orifice 11, thus reducing the air-induction effect. The air will thus act as a regulator ensuring that the quantity of milk received by the measuring chamber always has a constant relationship to the quantity of milk delivered at the discharge end of the milk line.

When the milk, co-mingled with air in the first orifice 9, reaches the end of the orifice lying within the measuring chamber 2, the milk will fall to the bottom of the chamber while, owing to the chamber being under vacuum, the occluded air will become separated from this milk and pass through the vacuum duct 7 into the main stream of milk flowing up the supply pipe. Thus the milk lying at the bottom of the measuring chamber will be substantially free from froth, thereby enabling an accurate reading to be taken.

Knowing the vacuum factor, the relative diameters of the second orifice 10 and the third orifice 11 can be so determined as to ensure that the results described above are always obtained without making the measuring chamber either too large or too small for convenient reading. At the same time, the relative diameters between the two orifices in question can be so chosen that the third orifice 11 is not so small as to have a wire-drawing or other detrimental effect on the milk passing through it, thereby ensuring that when milk received by the measuring chamber 2 is taken for sampling by removing the bottom stopper 4, the result of the tests will give a true indication of the quality of the milk delivered at the discharge end of the milk line.

The cup-like depression 12 at the lower end of the third orifice 11 has for its purpose to promote smooth and steady flow of milk into this orifice.

It is not easy at all times to keep flies out of milking sheds, and there may be an occasion when a fly settles on and blocks the outer end of the second orifice 10, thus causing the measuring chamber 2 to give a false reading. To avoid this, the outer end portion of the jet 8 can be formed with a fourth orifice 13 which crosses the second orifice 10 and thus gives two auxiliary openings to atmosphere, making three in all. With the other dimensions stated, the fourth orifice 13 may conveniently be of 60 S.W.G. in diameter.

There may be provided a tap (not shown) for isolating the supply pipe 1 from vacuum when desired. This tap may be fitted to the upper end portion of the supply pipe or to the part of the milk line lying adjacent to the upper end of the pipe.

In this specification, the term "milk line" is used in the broad sense as including not only the case where the pipe that is usually referred to as the milk line is designed for direct connection to the teat-cup claw, but also the case where the connection to the claw is made through the medium of a dropper depending from an elevated milk line.

What I do claim and desire to secure by Letters Patent of the United States of America is:

1. A milk yield indicator and sampling device, comprising a vertically arranged supply pipe adapted to be interposed in the milk line of a vacuum operated milking machine having a teat-cup claw so that its upper end will be in communication with the discharge side of the line while its lower end will be in communication with the teat-cup claw, a tubular constrictor within the pipe; a transparent and calibrated measuring chamber arranged vertically and secured to one side of the supply pipe; a duct extending between the supply pipe and measuring chamber to enable the measuring chamber to be evacuated and subjected to a vacuum when suction is created in the supply pipe; and a jet tube passing from the outside of the supply pipe, through the constrictor and into the measuring chamber, the jet tube having a first orifice of relatively large diameter opening into the measuring chamber, a second orifice of relatively small diameter communicating with the first orifice and opening to atmosphere externally of the supply pipe, and a third orifice extending downwardly from the first orifice and opening into the constrictor so that a portion of the milk passing through the supply pipe will be diverted through the third and first orifices into the measuring chamber, the sizes of the second and third orifices being so related to one another that air passing from atmosphere through the second orifice will act to control the flow of diverted milk in such manner as to ensure that the quantity of milk reaching the measuring chamber will be constantly proportional to the quantity of milk passing through the supply pipe.

2. A device in accordance with claim 1 and wherein the measuring chamber is a vertically disposed transparent tube bonded to the supply pipe, the chamber being marked with graduations serving a two-fold purpose, namely to indicate the quantity of milk actually received by the measuring chamber and to provide an index to the quantity of milk that has passed through the supply pipe.

3. A device in accordance with claim 2 and including removable stoppers closing the upper and lower ends of the measuring chamber.

4. A device in accordance with claim 2 and wherein the upper end portion of the supply pipe projects above the upper end of the measuring chamber, while the lower end portion of the measuring chamber extends below the lower end of the supply pipe.

5. A device in accordance with claim 4 and wherein the lower end portion of the supply pipe is curved outwardly from the measuring chamber.

6. A device in accordance with claim 4 and wherein the tubular constrictor is bonded within the bore of the supply pipe and is arranged adjacent to the upper end of the measuring chamber.

7. A device in accordance with claim 6 and wherein the duct permitting the measuring chamber to be evacuated is positioned above the constrictor, the duct passing through the part of the wall of the supply pipe adjoining the bond between supply pipe and measuring chamber, through the bond itself, and through the adjoining part of the side wall of the measuring chamber, so that the duct has one end opening into the supply pipe and the other end opening into the upper part of the measuring chamber.

8. A device in accordance with claim 6 and wherein the jet tube passes from the outside of the supply pipe, diametrically therethrough and hence diametrically across the bore of the constrictor, and then into the measuring chamber.

9. A device in accordance with claim 1 and wherein the third orifice of the jet is of smaller diameter than that of the second orifice.

10. A device in accordance with claim 1 and wherein the third orifice is positioned in alignment with the axis of the bore of the constrictor.

11. A device in accordance with claim 1 and wherein the lower end of the third orifice opens into a shallow cup-like depression formed in the lower edge of the jet tube.

12. A device in accordance with claim 1 and wherein the portion of the jet tube lying outside the supply pipe is provided with a fourth orifice which crosses the second orifice.

13. A device in accordance with claim 12 and wherein the diameter of the fourth orifice is less than that of the second orifice.

References Cited by the Examiner

UNITED STATES PATENTS

| | | | |
|---|---|---|---|
| 669,347 | 3/01 | Quinn | 73—421 X |
| 2,966,800 | 1/61 | Clegg | 73—422 |

RICHARD C. QUEISSER, *Primary Examiner.*

JOSEPH P. STRIZAK, *Examiner.*